(12) United States Patent
Song et al.

(10) Patent No.: US 11,778,295 B2
(45) Date of Patent: Oct. 3, 2023

(54) CAMERA MODULE AND ELECTRONIC DEVICE HAVING THE CAMERA MODULE

(71) Applicant: TRIPLE WIN TECHNOLOGY(SHENZHEN) CO. LTD., Shenzhen (CN)

(72) Inventors: Jian-Chao Song, Guangdong (CN); Shin-Wen Chen, New Taipei (TW); Sheng-Jie Ding, Guangdong (CN); Jing-Wei Li, Guangdong (CN); Ding-Nan Huang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/501,138

(22) Filed: Oct. 14, 2021

(65) Prior Publication Data

US 2022/0201168 A1    Jun. 23, 2022

(30) Foreign Application Priority Data

Dec. 19, 2020 (CN) .......................... 202011510340.0

(51) Int. Cl.
  *H04N 23/55* (2023.01)
  *G02B 1/10* (2015.01)
  *G02B 7/02* (2021.01)
  *H04N 23/54* (2023.01)
  *H04N 23/57* (2023.01)

(52) U.S. Cl.
  CPC ............... *H04N 23/55* (2023.01); *G02B 1/10* (2013.01); *G02B 7/022* (2013.01); *H04N 23/54* (2023.01); *H04N 23/57* (2023.01)

(58) Field of Classification Search
  CPC .. H04N 5/2254; H04N 5/2253; H04N 5/2257; G02B 1/10; G02B 7/022; G02B 7/006; G03B 17/12
  See application file for complete search history.

(56) References Cited

U.S. PATENT DOCUMENTS

| 2006/0119730 | A1* | 6/2006 | Shiraishi | ............ H04N 5/22521 348/342 |
| 2009/0109330 | A1* | 4/2009 | Nakano | .................. G02B 7/08 348/E5.026 |
| 2018/0095204 | A1* | 4/2018 | Lin | ........................ G02B 5/003 |
| 2019/0170994 | A1* | 6/2019 | Li | ........................ G02B 21/361 |
| 2019/0227410 | A1* | 7/2019 | Yang | ....................... G03B 17/02 |
| 2019/0361193 | A1* | 11/2019 | Zhang | ....................... G02B 7/02 |

* cited by examiner

*Primary Examiner* — Sinh Tran
*Assistant Examiner* — Zhenzhen Wu
(74) *Attorney, Agent, or Firm* — ScienBiziP, P.C.

(57) ABSTRACT

A camera module includes a circuit board, a photosensitive chip, a filter, a lens base, and a lens. The photosensitive chip is mounted on the circuit board. The lens base is mounted on the circuit board and receives the photosensitive chip therein. The filter is mounted in the lens base and positioned above the photosensitive chip. The lens is mounted in the lens base and positioned above the photosensitive chip. A dust-absorbing film is arranged in the lens base and located above the filter. An electronic device having the camera module is also provided.

16 Claims, 8 Drawing Sheets

CAMERA MODULE AND ELECTRONIC DEVICE HAVING THE CAMERA MODULE

FIELD

The subject matter herein generally relates to a camera module and an electronic device having the camera module.

BACKGROUND

Most camera modules include a lens, a lens holder, a filter, a photosensitive chip, and a circuit board. The lens is installed in the lens holder, the lens holder and the photosensitive chip are installed on the circuit board, and the filter is installed above the photosensitive chip. In order to prevent dust and impurities from entering the lens module and affecting the imaging quality, a closed space must be enclosed between the lens holder, filter, photosensitive chip, and circuit board. Of course, when the lens is installed in the lens holder, dust and impurities are easy to produce. When dust and impurities fall on the filter, the image will be stained, and the dust and impurities will also rise and fall when the camera module is shaken or dropped.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 1:
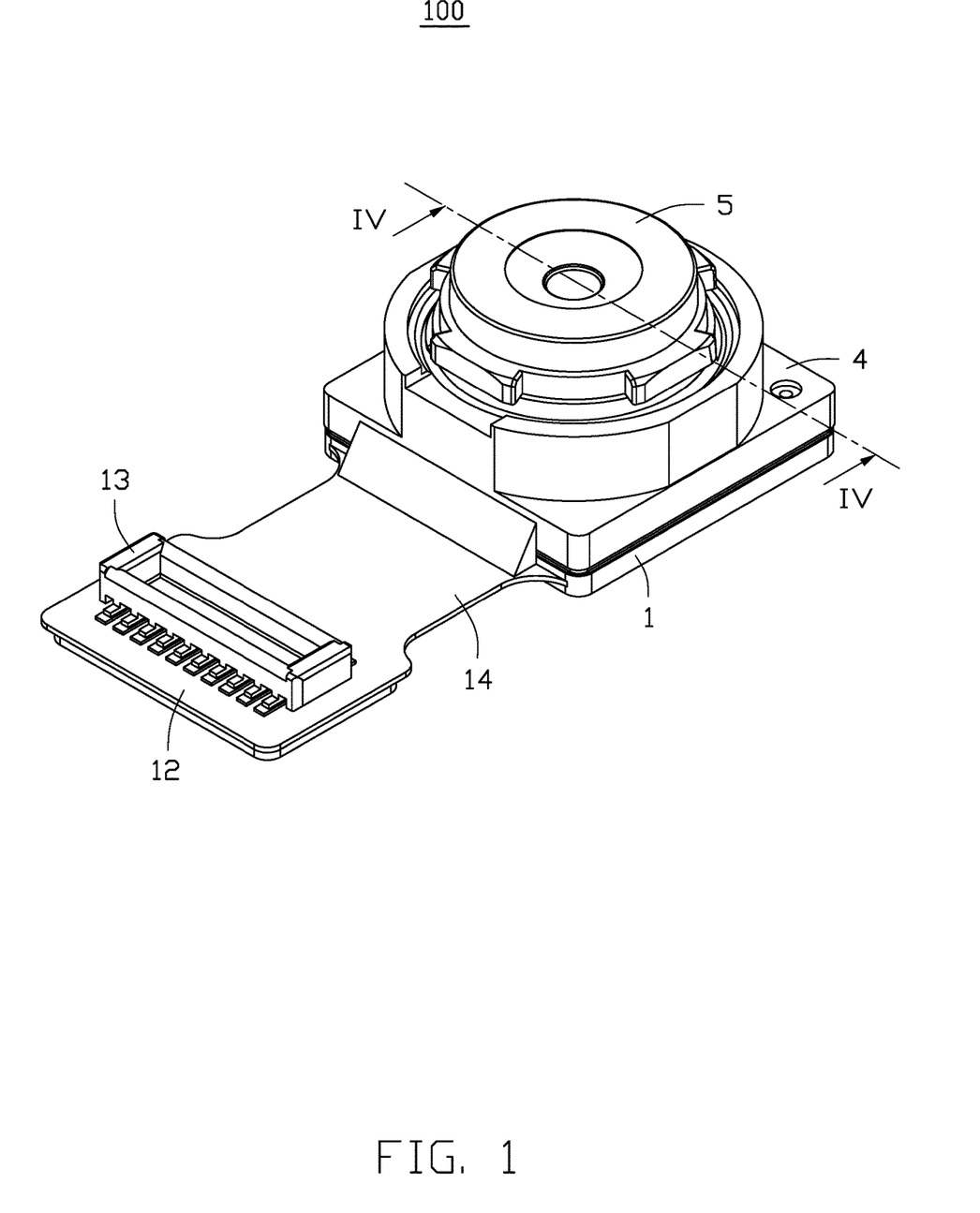
FIG. 1 is a diagram of an embodiment of a camera module according to the present disclosure.
Figure 2:
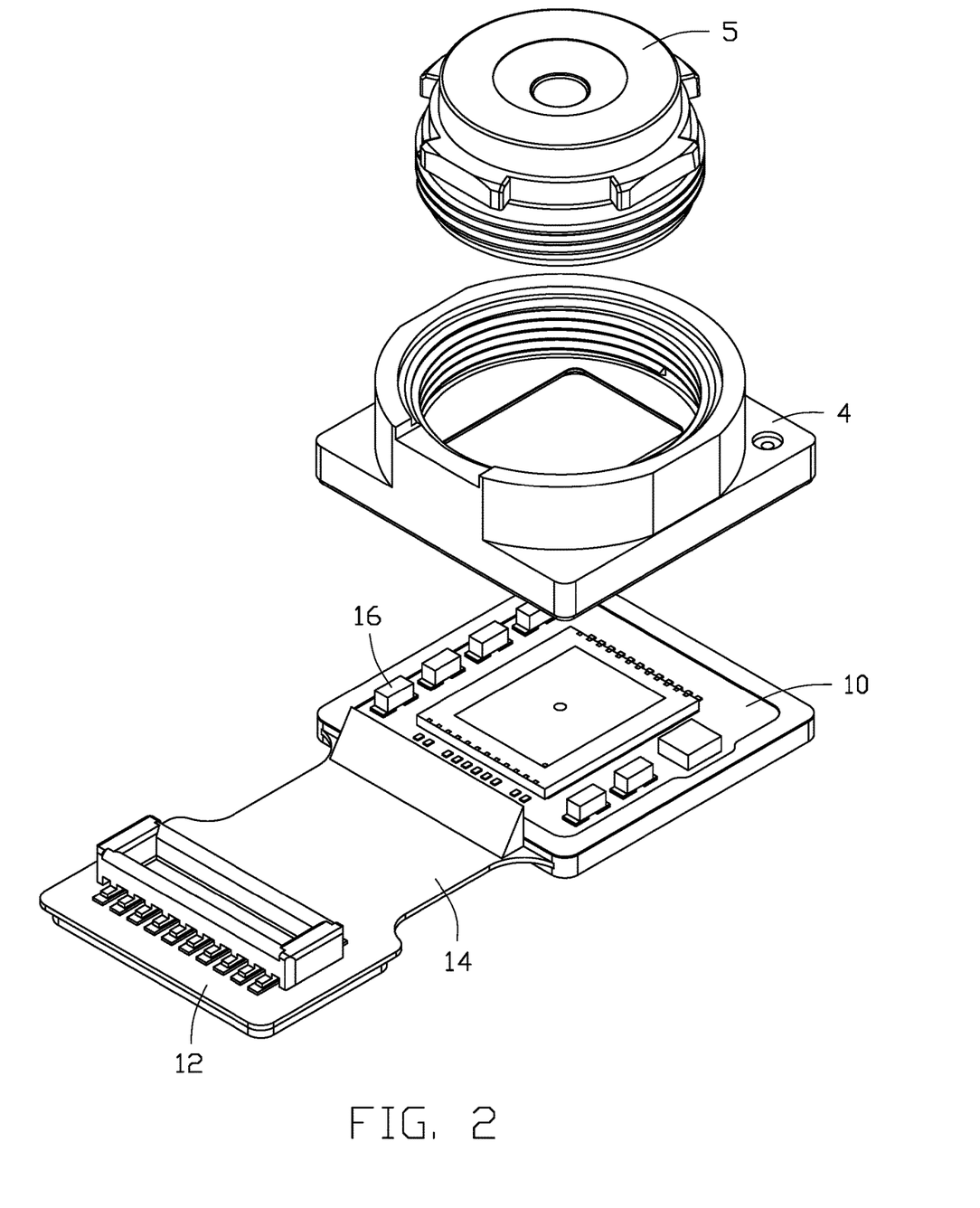
FIG. 2 is an exploded, diagrammatic view of an embodiment of a camera module according to the present disclosure.
Figure 3:
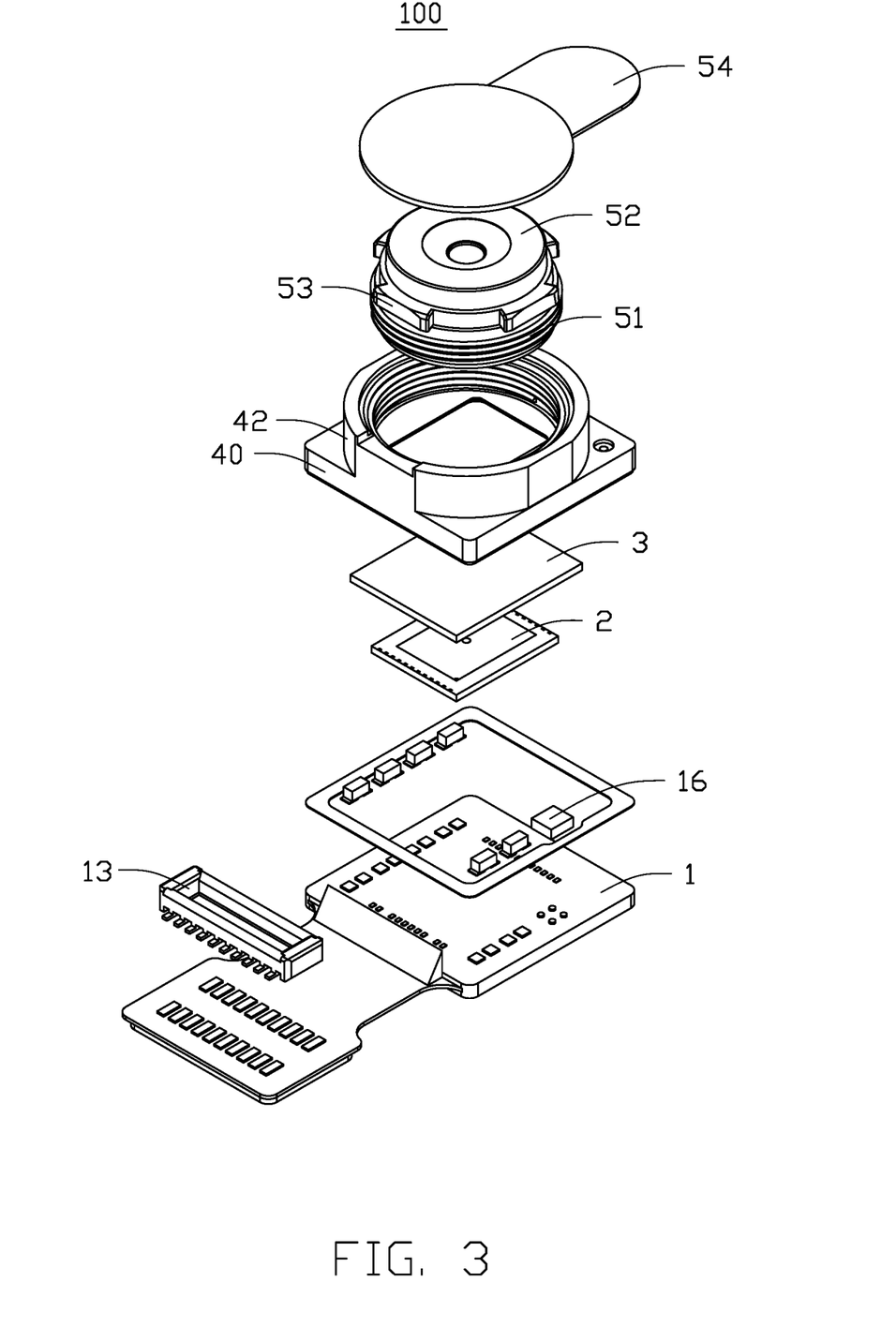
FIG. 3 is another exploded, diagrammatic view of an embodiment of a camera module according to the present disclosure.

FIG. 1 illustrates an embodiment of a camera module 100. Referring to FIGS. 1 to 3, the camera module 100 includes a circuit board 1, a photosensitive chip 2, a filter 3, a lens base 4, and a lens 5. The photosensitive chip 2 is mounted on the circuit board 1. The lens base 4 is mounted on the circuit board 1 and receives the photosensitive chip 2 therein. The filter 3 is mounted in the lens base 4 and positioned above the photosensitive chip 2. The lens 5 is mounted in the lens base 4 and positioned above the photosensitive chip 2. A dust-absorbing film 409 (shown in FIG. 7) that can absorb dust is arranged in the lens base 4. The dust-absorbing film 4 is located above the filter 3. The camera module 100 can prevent dust and impurities and absorb astigmatism.

In at least one embodiment, the circuit board 1 may be a flexible circuit board, a rigid circuit board, or a flexible-rigid circuit board. Preferably, the circuit board 1 is a flexible-rigid circuit board. Referring to FIG. 2, the circuit board 1 includes a first rigid portion 10, a second rigid portion 12, and a flexible portion 14. The flexible portion 14 is connected between the first rigid portion 10 and the second rigid portion 12. The first rigid portion 10 may be in a shape of a rectangular frame. The photosensitive chip 2 and a plurality of electronic components 16 are mounted on a surface of the first rigid portion 10. The photosensitive chip 2 is located on a center of the surface of the first rigid portion 10. The plurality of electronic components 16 are divided into two rows, which are arranged on opposite sides of the photosensitive chip 2. An electrical connecting portion 13 is mounted on the second rigid portion 12. When the camera module 100 is applied in an electronic device 200 (shown in FIG. 8), the electrical connecting portion 13 is used to implement signal transmission between the camera module 100 and other components of the electronic device 200. The electrical connecting portion 13 may be a connector or a golden finger. In at least one embodiment, the photosensitive chip 2, the plurality of electronic components 16, and the electrical connecting portion 13 may be located on a same surface of the circuit board 1.

In at least one embodiment, the photosensitive chip 2 may have a rectangular shape. Each electronic component 16 may be a passive component such as a resistor, a capacitor, a diode, a triode, a relay, or an electrically erasable programmable read-only memory (EEPROM).

Figure 4:
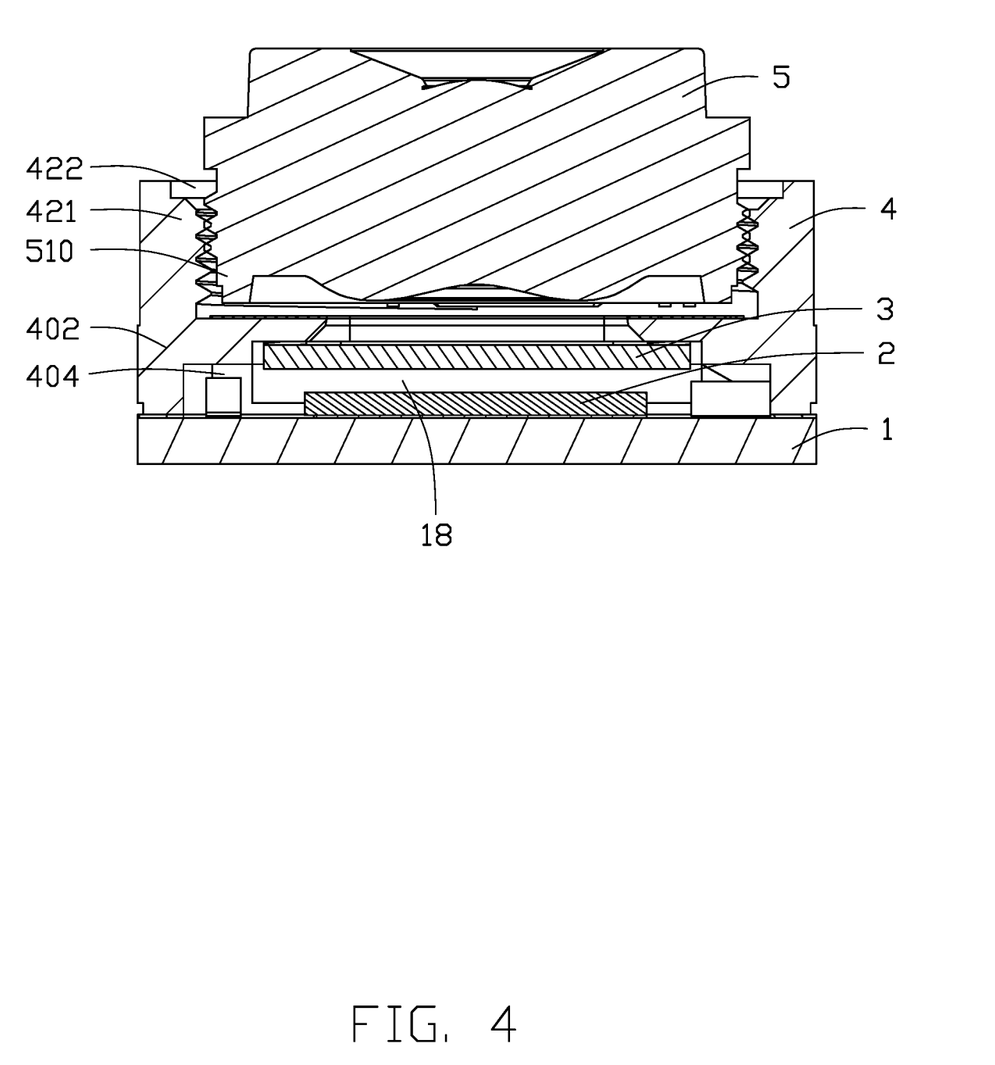
FIG. 4 is a cross-sectional view of the camera module taken along I-I line of FIG. 1.

Referring to FIG. 3 and FIG. 4, the filter 3 is fixed in the lens base 4 by an adhesive layer and located above the circuit board 1. The filter 3 is spaced from the photosensitive chip 2. The filter 3, the lens base 4, and the circuit board 1 enclose a closed receiving space 18. The photosensitive chip 2 and the electronic components 16 are received in the receiving space 18. Dust and impurities are prevented from entering into the receiving space 18, thereby preventing from affecting an imaging quality of the camera module 100.

Referring to FIG. 1 and FIG. 4, the lens base 4 is mounted on the circuit board 1 by a curing glue. Referring to FIG. 3, the lens base 4 includes a substrate 40 and a protrusion 42 extending from a surface of the substrate 40. In at least one embodiment, the substrate 40 has a frame shape, and the protrusion 42 has a cylindrical shape.

The lens base 4 may be made of metal or plastic. Preferably, the lens base 4 is made of aluminum alloy.

Figure 5:
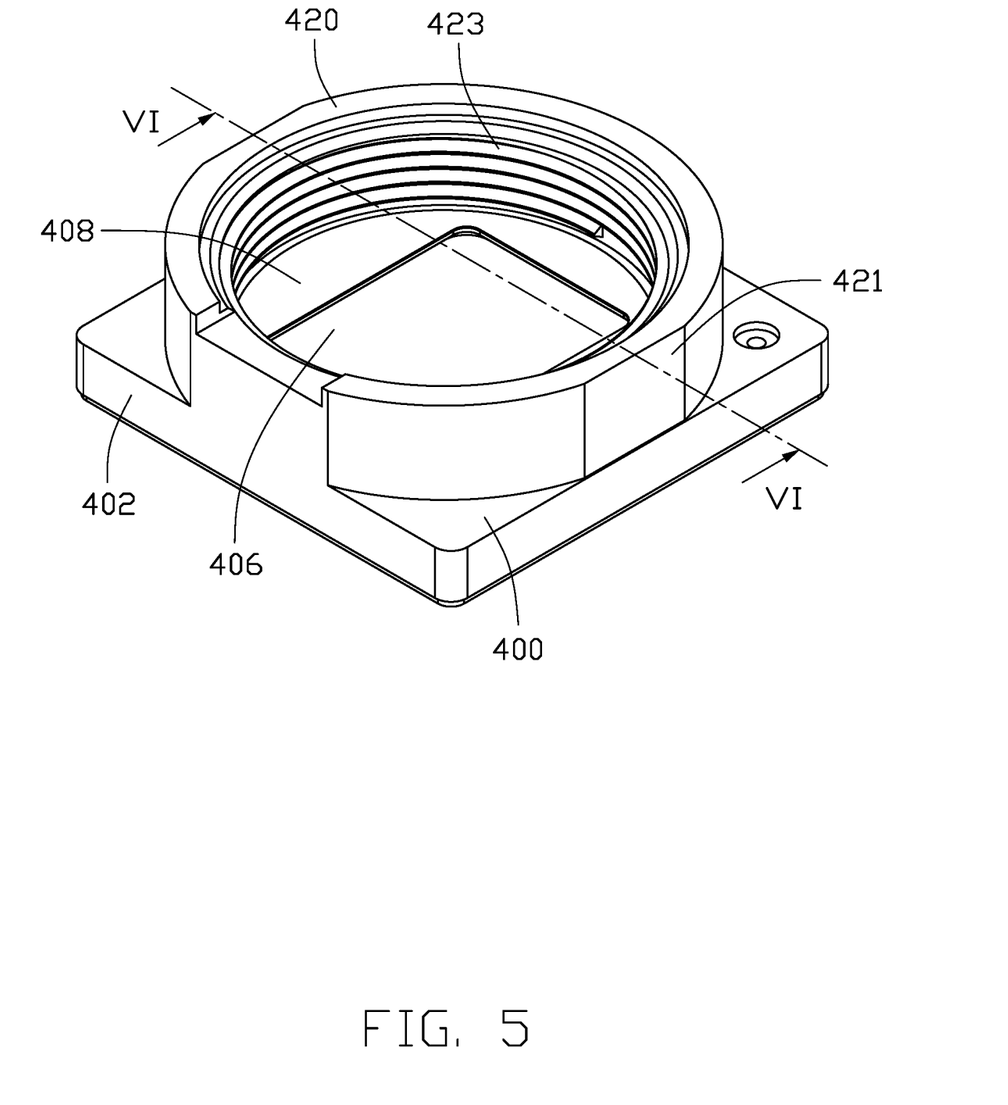
FIG. 5 is a diagram of an embodiment of a lens base according to the present disclosure.

Referring to FIG. 4 and FIG. 5, the substrate 40 includes a first top wall 400 and a first side wall 402 vertically extending from a periphery of the first top wall 400. An end of the first side wall 402 facing away from the first top wall 400 is mounted on the circuit board 1. A first through hole 406 penetrates the first top wall 400. The filter 3 is mounted on a surface of the first top wall 400 facing the circuit board 1 and covers the first through hole 406. The first top wall 400, the filter 3, the first side wall 402, and the circuit board 1 enclose the receiving space 18.

The protrusion 42 extends from the first top wall 400 in a direction away from the first side wall 402. In at least one embodiment, the protrusion 42 may extend along an inscribed circle of the first top wall 400. The protrusion 42 includes a second top wall 420 facing away from the first top wall 400 and a second side wall 421 connected between the second top wall 420 and the first top wall 400. A second through hole 422 penetrates the second top wall 420 and the second side wall 421 and communicates with the first though hole 406. A first thread 423 is formed on an inner surface surrounding to define the second through hole 422. A second thread 512 is formed on an outer surface of the lens 5. The first thread 423 and the second thread 512 are matched to install the lens 5 in the second through hole 422.

The first top wall 400 includes an inner area 408 corresponding the second through hole 422. The first through hole 406 is located in the inner area 408. The dust-absorbing film 409 is formed on a surface of the inner area 408 facing away from the circuit board 1. The dust-absorbing film 409 may be formed by sprayed on the surface of the inner area 408 facing away from the circuit board 1, or may be made into a film and then attached to the surface of the inner area 408 facing away from the circuit board 1.

Figure 6:
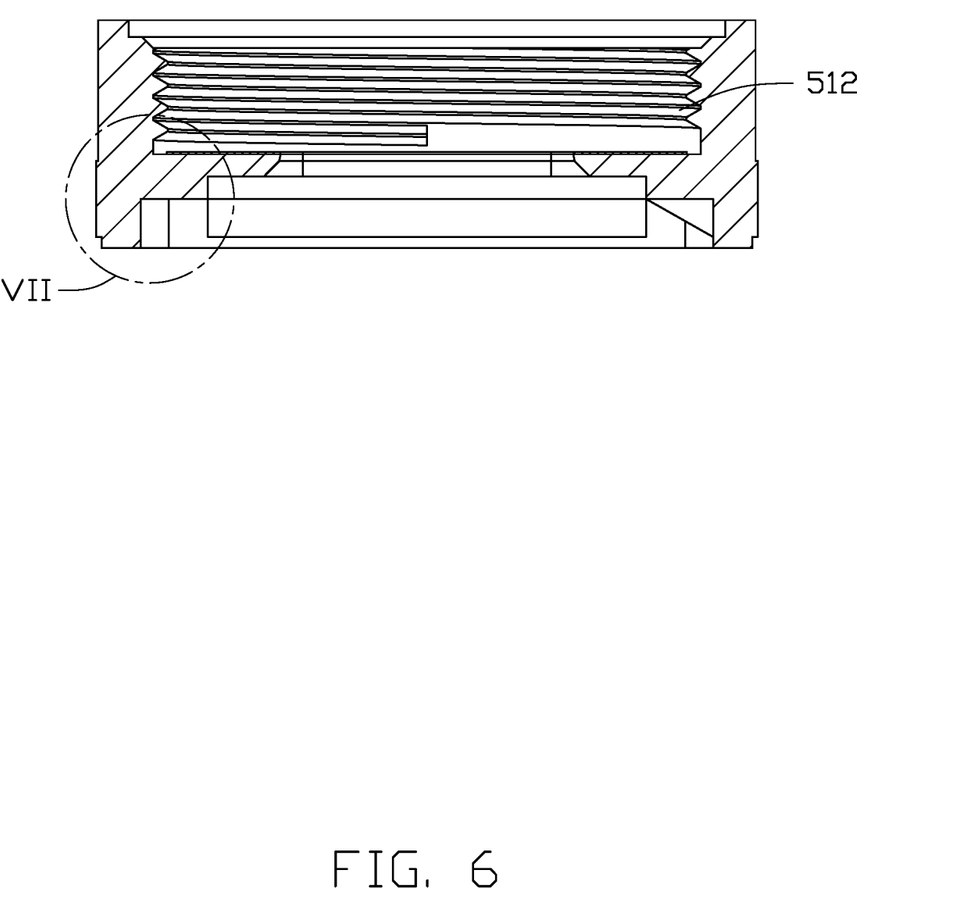
FIG. 6 is a cross-sectional view of the lens base taken along II-II line of FIG. 5.
Figure 7:
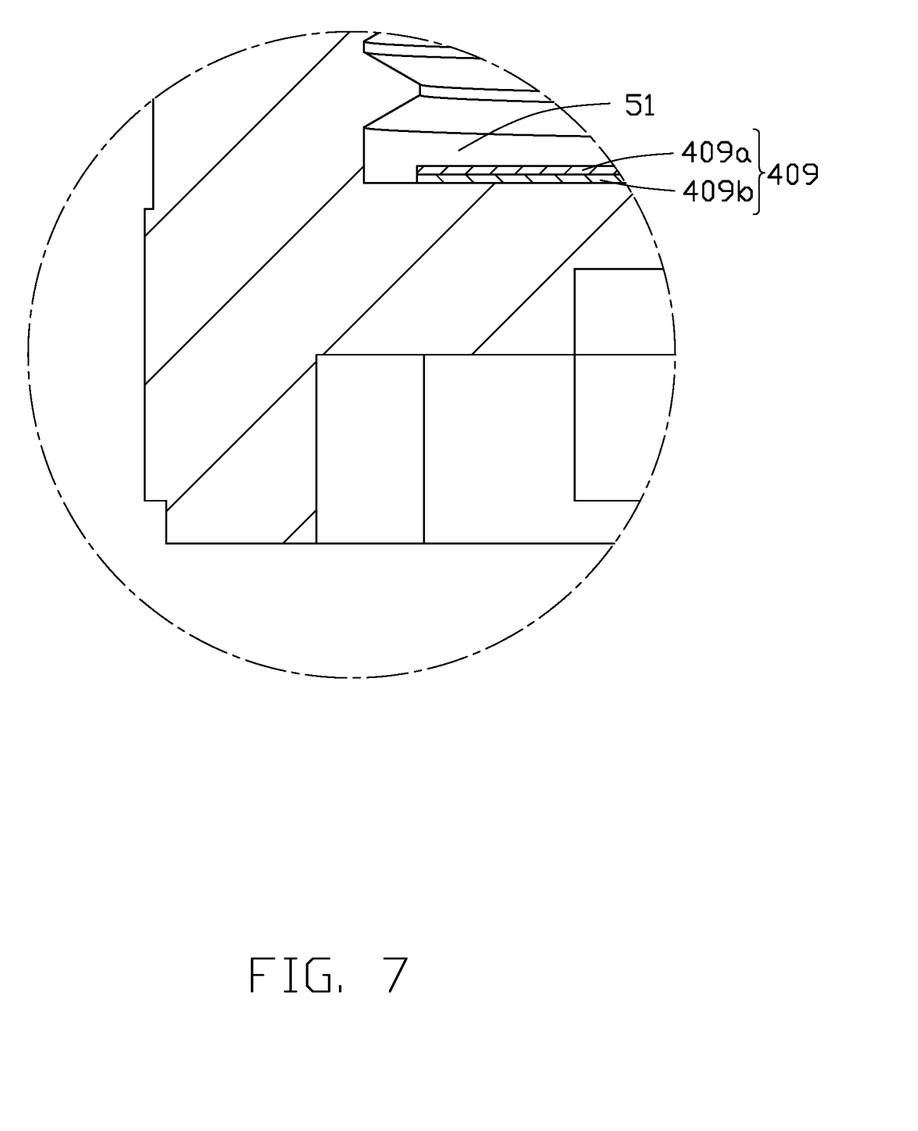
FIG. 7 is an enlarger schematic diagram of a partial area A of the lens base of FIG. 6.

Referring to FIG. 5, FIG. 6, and FIG. 7, the dust-absorbing film 409 may include a base layer 409b made of silicon dioxide or titanium dioxide on the surface of the inner area 408 facing away from the circuit board 1 and a water-based protective layer 409a arranged on a surface of the base layer 409b facing away from the surface of the inner area 408 facing away from the circuit board 1. The water-based protective layer 409a can absorb dust and impurities, and purify the air. The dust-absorbing film 409 has long-lasting adhesiveness, high adhesion strength, and high temperature resistance, can effectively absorb dust and impurities, and can also prevent mechanical impact and oxidation.

When an external light passes through the lens, the light is continuously refracted inside the lens base, and will eventually be reflected to the photosensitive chip 2 again, causing a light spot. The lens base 4 described in the present disclosure is provided with a dust-absorbing film 409. Since the base layer is made of silicon dioxide or titanium dioxide, it has a good absorption effect on stray light, so it can reduce the light spots and effectively avoid astigmatism, thereby improving the shooting effect of the camera module 100.

In at least one embodiment, the dust-absorbing film 409 may further formed on the inner surface defining the second through hole 422 to absorb dust and impurities, thereby improving the shooting effect of the camera module 100.

Referring to FIG. 3 and FIG. 4, the lens 5 is received in the second through hole 422 of the lens base 4. The lens base 4 and the lens 5 may be assembled together or integrally formed. In at least one embodiment, the lens base 4 and the lens 5 are assembled together. The lens 5 includes a first lens portion 51 and a second lens portion 52. The first lens portion 51 and the second lens portion 52 are integrally formed. A diameter of the second lens portion 52 is less than a diameter of the first lens portion 51. A plurality of flanges 53 are formed at a junction between the first lens portion 51 and the second lens portion 52. When the first lens portion 51 is embedded in the second through hole 422 of the protrusion 42, the flanges 53 abut on the second top wall 420 of the protrusion 42, the second lens portion 52 is out of the second through hole 422 of the protrusion 42. A protective film 54 is installed on a top of the second lens portion 52 away from the first lens portion 51 to protect the lens 5.

The second thread 512 is formed on an area of the outer surface of the lens 5 corresponding to the first lens portion 51.

Figure 8:
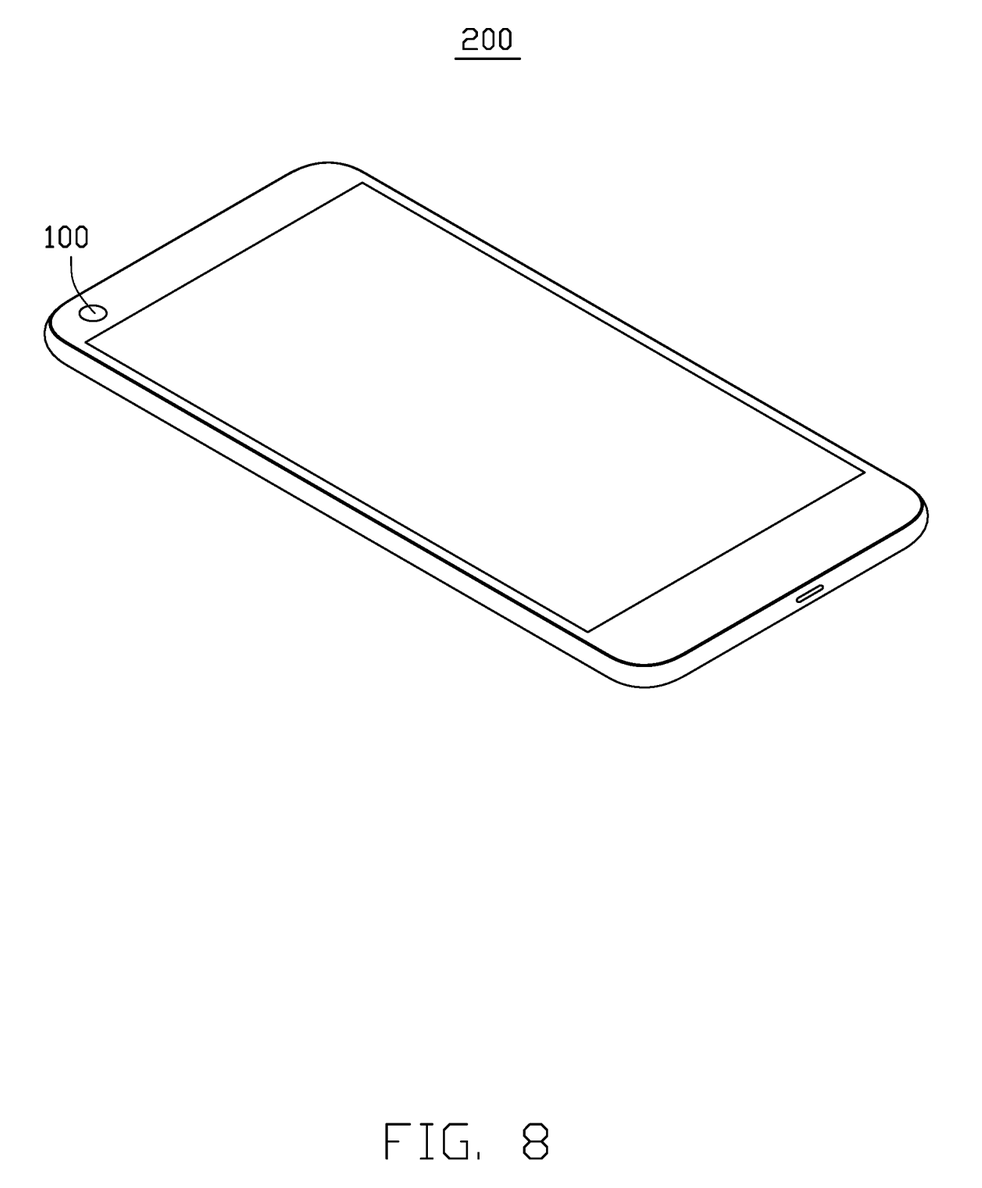
FIG. 8 is a diagram of an embodiment of an electronic device according to the present disclosure.

FIG. 8 illustrates an embodiment of an electronic device 200 including the above camera module 100. The electronic device 200 may be, but not limited to, a mobile phone, a wearable device, a computer device, a vehicle or a monitoring device.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
   a circuit board;
   a photosensitive chip;
   a filter;
   a lens base; and
   a lens;
   wherein the photosensitive chip is mounted on the circuit board, the lens base is mounted on the circuit board and receives the photosensitive chip therein, the filter is mounted in the lens base and positioned above the photosensitive chip, the lens is mounted in the lens base and positioned above the photosensitive chip, a dust-absorbing film is arranged in the lens base and located above the filter, the dust-absorbing film comprises a base layer made of silicon dioxide or titanium dioxide and a water-based protective layer on a surface of the base layer facing away from the circuit board.

2. The camera module of claim 1, wherein the lens base comprises a substrate on the circuit board and a protrusion, the substrate comprises a first top wall, the protrusion extends from the first top wall in a direction away from the circuit board, a first through hole penetrates the first top wall and corresponds to the filter, a second through hole penetrates the protrusion and communicates with the first through hole, the lens is received in the second through hole.

3. The camera module of claim 2, wherein the first top wall comprises an inner area corresponding the second through hole, the first through hole is located in the inner area, the dust-absorbing film is formed on a surface of the inner area facing away from the circuit board.

4. The camera module of claim 3, wherein a first thread is formed on an inner surface surrounding to define the second through hole, a second thread is formed on an outer surface of the lens, the first thread and the second thread are matched.

5. The camera module of claim 4, wherein the dust-absorbing film is further formed on the inner surface surrounding to define the second through hole.

6. The camera module of claim 4, wherein the filter is fixed on a surface of the first top wall facing the circuit board.

7. The camera module of claim 6, wherein the filter, the lens base, and the circuit board enclose a closed receiving space, the photosensitive chip is received in the receiving space.

8. The camera module of claim 4, wherein the lens comprises a first lens portion and a second lens portion, a diameter of the second lens portion is less than a diameter of the first lens portion, a plurality of flanges are formed at a junction between the first lens portion and the second lens portion, the first lens portion is mounted in the second through hole, the second lens portion and the plurality of flanges are located outside the second through hole.

9. An electronic device comprising:
a filter;
a lens base; and
a lens;
wherein the photosensitive chip is mounted on the circuit board, the lens base is mounted on the circuit board and receives the photosensitive chip therein, the filter is mounted in the lens base and positioned above the photosensitive chip, the lens is mounted in the lens base and positioned above the photosensitive chip, a dust-absorbing film is arranged in the lens base and located above the filter, the dust-absorbing film comprises a base layer made of silicon dioxide or titanium dioxide and a water-based protective layer on a surface of the base layer facing away from the circuit board.

10. The electronic device of claim 9, wherein the lens base comprises a substrate on the circuit board and a protrusion, the substrate comprises a first top wall, the protrusion extends from the first top wall in a direction away from the circuit board, a first through hole penetrates the first top wall and corresponds to the filter, a second through hole penetrates the protrusion and communicates with the first through hole, the lens is received in the second through hole.

11. The electronic device of claim 10, wherein the first top wall comprises an inner area corresponding the second through hole, the first through hole is located in the inner area, the dust-absorbing film is formed on a surface of the inner area facing away from the circuit board.

12. The electronic device of claim 11, wherein a first thread is formed on an inner surface surrounding to define the second through hole, a second thread is formed on an outer surface of the lens, the first thread and the second thread are matched.

13. The electronic device of claim 12, wherein the dust-absorbing film is further formed on the inner surface surrounding to define the second through hole.

14. The electronic device of claim 12, wherein the filter is fixed on a surface of the first top wall facing the circuit board.

15. The electronic device of claim 14, wherein the filter, the lens base, and the circuit board enclose a closed receiving space, the photosensitive chip is received in the receiving space.

16. The electronic device of claim 12, wherein the lens comprises a first lens portion and a second lens portion, a diameter of the second lens portion is less than a diameter of the first lens portion, a plurality of flanges are formed at a junction between the first lens portion and the second lens portion, the first lens portion is mounted in the second through hole, the second lens portion and the plurality of flanges are located outside the second through hole.

* * * * *